Patented June 19, 1945

2,378,673

UNITED STATES PATENT OFFICE 2,378,673

SHOE STIFFENER BLANKS

John W. Wiley, Lancaster Township, Lancaster County, Pa., assignor to Armstrong Cork Company, Lancaster, Pa., a corporation of Pennsylvania No Drawing. Application January 24, 1942, Serial No. 428,037

6 Claims. (Cl. 36—77)

This invention relates to shoe stiffener blanks and, more particularly, to box toe blanks and box toe material carrying a suitable stiffening compound which is adapted to be rendered soft and plastic by the application of moderate heat so that, in the lasting operation in the manufacture of shoes, the blank may be molded about and takes the shape of the toe end of the last, and on cooling retains such shape.

A satisfactory shoe stiffener should be hard, tough, strong and flexible so that it will impart to a shoe a maximum degree of firmness and yet not be brittle, so that, when subjected to a deforming pressure, it will resume its original shape upon removal of the pressure. A stiffener should adhere to adjacent parts of a shoe to form a unitary structure, but such adhesion should not be accompanied by staining. To fit in the rapid routine of modern shoe manufacture, the stiffener need be adapted to be tempered or rendered soft or plastic quickly, and, when in such condition, it need be capable of being lasted with little effort on the part of the operator. In addition, the stiffener need be economical in cost to permit its commercial utilization.

Various attempts have been made to produce box toe blanks possessing these characteristics. For example, fibrous blanks have been impregnated with a stiffening agent composed of crude rubber, casein, resins, wax and gums. The stiffening agent was formed by milling crude rubber with a casein paste to condition the rubber, and finely mixing the conditioned rubber with the resinous ingredients in a molten condition. The stiffening agent so prepared consisted of a thermoplastic mass having conditioned rubber particles or lumps dispersed therethrough. This product was uneconomical and unsatisfactory; the continued milling of the rubber and the high temperatures used in the mixing operation destroyed the inherent resiliency of the rubber and resulted in depolymerization to a material degree so that a large amount of rubber was required to manufacture the stiffening agent. The product formed by such procedure is brittle, friable and inflexible, thus it is undesirable and unsatisfactory from a commercial viewpoint.

Another procedure heretofore proposed consists in the impregnation of a fibrous material with a thermoplastic composition formed by mixing rubber and copal, and then adding the mixture to a fused mass of rosin. The composition so formed is highly viscous; when used to impregnate a fibrous sheet in the manufacture of shoe stiffeners tremendous dilution by solvents is required or the temperature of the mass need be maintained so high to permit impregnation as to result in depolymerization of the rubber. In either case, the resulting product is not commercially satisfactory; in one case, insufficient stiffening agent is present in the final product and in the second case the properties imparted to the agent by the addition of rubber are lost by its depolymerization. That is, the rubber used does not add toughness and strength to the final product but the product is brittle, friable and inflexible and does not possess the properties discussed above which are essential in a commercially satisfactory product.

The chief object of this invention is to eliminate the disadvantages inherent in such shoe stiffeners and their method of manufacture. An object of my invention is to provide an improved shoe stiffener. A further object of my invention is to provide a shoe stiffener which is stiff, tough, strong, flexible and resilient when cold, and which is easily and readily rendered limp or plastic when heated to a moderate temperature not injurious to leather, and which is economical in manufacture. A still further object is to provide a method of making the improved shoe stiffener.

This invention relates to a normally stiff, resilient shoe stiffener blank adapted to be rapidly rendered soft and plastic by the application of moderate heat which comprises a readily permeable fibrous base carrying within its interstices and on its surfaces a solidified thermoplastic solution composed of rubber dissolved in a thermoplastic material and then vulcanized so that the solution retains substantially the thermoplasticity of the thermoplastic material alone, the thermoplastic material being present in sufficient quantity to impart to the stiffener plasticity under the application of moderate heat, and the rubber being present in sufficient amount to enhance the strength and toughness of the stiffener while substantially maintaining the thermoplasticity thereof. The statement above that the thermoplastic solution retains substantially the thermoplasticity of the thermoplastic material alone means that the solution, when conditioned to render the blank capable of use in the pulling-over and bed-lasting operations, is rapidly rendered soft and plastic at approximately the same temperatures as a stiffening agent composed solely of the thermoplastic material.

In the present invention, I employ a stiffening compound which comprises a solution composed of rubber dissolved in a thermoplastic material such as rosin and then vulcanized so that the solution retains substantially the thermoplasticity of the thermoplastic material. The stiffening compound is so prepared that a solution is formed having a softening point at a moderate temperature, say 175° F. to 185° F., which is not injurious to the leather components of the shoe and which sets rapidly when cooled. A porous, absorbent foundation or base, such as felt, paper, cotton flannel, canvas or the like is impregnated or saturated with the stiffening compound in liquid form, and the compound is solidified without precipitating the rubber or affecting the solution to any material degree. Shoe stiffener blanks of appropriate size and shape may then be formed from the impregnated base.

In order that my invention may be understood readily, I will describe a preferred embodiment thereof. A satisfactory stiffening compound may be formed by following the procedure outlined below:

A rubber-resin master batch is first prepared and may comprise the following ingredients in substantially the proportions given by weight:

| | Parts |
|---|---|
| Reclaim rubber | 47.4 |
| Cumar | 38.0 |
| Rosin | 9.4 |
| Sulfur | 4.7 |
| Anti-oxidant | 0.5 |

The reclaim rubber is placed in a rubber mill heated to approximately 250° F. The cumar and rosin, preferably, in the form of broken lumps or small pieces, are then added to the rubber and milled therewith until a homogeneous mass is formed which generally requires about fifteen minutes. The sulfur and anti-oxidant are then dispersed in the rubber-resin mass, which requires about two to three minutes, and the mass is immediately removed from the mill to prevent vulcanization of the rubber. A homogeneous mass is thus formed with little or no vulcanization of the rubber. The mass may be cooled and stored for use for several months without vulcanization occurring or, if desired, it may be used immediately.

If desired, crude-rubber or so-called guayule rubber may be used in place of reclaim rubber; generally speaking, the use of artificial rubbers of the polymerized chloroprene or polymerized butadiene types is undesirable since they do not appear to form a satisfactory solution with rosin, for example. I may use any of the various grades of rosin or I may substitute therefor any of the usual thermoplastic materials commonly used in the industry. If desired, the cumar may be omitted and rosin or montan wax used in its place or montan wax may be used in place of rosin and/or cumar. As an anti-oxidant, I prefer to use "Age-Rite" but any of the usual commercial anti-oxidants may be used with satisfactory results.

A satisfactory thermoplastic stiffening compound may be made by the following formula:

| | Parts by weight |
|---|---|
| Rubber-resin master batch | 22.4 |
| Candelilla wax | 2.0 |
| Rosin | 75.6 |

If desired, montan wax may be used in place of candelilla wax. As previously stated, any of the thermoplastic materials common in the industry may be used in place of rosin.

The rosin and candelilla wax are placed in a suitable mixer and heated to approximately 150–160° F. for about one hour to melt or fuse the rosin and the wax. Preferably, the mixer is heated before the rosin and wax are placed therein to decrease the time of fusion. The master batch is then added slowly while the mixer is agitating the melted mass and the master batch is dissolved in the mass to form a solution. At a temperature of 150–160° F., it requires roughly six hours to obtain complete dissolution and at this time the viscosity of the mass is increased appreciably.

After complete dissolution of the master batch in the fused thermoplastic mass to form a solution, the temperature of the mass is raised to 220° F. to vulcanize the rubber. The solution becomes thinner and less viscous as vulcanization of the rubber proceeds since the rubber loses its thermoplasticity and gummy characteristics which tend to increase the viscosity of the solution until approximately the original viscosity of thermoplastic material is reached. It requires about sixteen hours for satisfactory vulcanization at the temperature disclosed above and in all cases the vulcanizing temperature need be sufficiently low as not to effect substantially depolymerization of the rubber. The time required to form a satisfactory stiffening compound is from eight to forty-eight hours varying, of course, with the temperatures at which the operation is conducted.

If desired, the temperature of dissolution of the master batch in the rosin-wax mass may vary from 150° F. to perhaps 350° F.; the length of the period of dissolution, of course, varies inversely as the temperature. That is, higher temperatures require a shorter period of time to obtain complete dissolution; for example, at 350° F. the master batch dissolves satisfactorily to form a solution within a few minutes and the rubber may then be vulcanized. In all cases, it is essential that the temperature of the mass and length of dissolution time be coordinated so as not to effect substantially depolymerization or vulcanization of the rubber.

The stiffening compound so prepared appears under microscopic examination at 1000 magnifications to possess the characteristics of a solution, that is, each of the individual ingredients composing the compound appears to have lost its individual identity whether the compound is in its liquid or solid phase. At least the rubber particles are not present with their initial identity in the stiffening compound so prepared under microscopic examination at the magnification above mentioned so that I believe the compound to be either a colloidal or a true solution. An additional fact which appears to confirm my belief that the compound is a solution is the change in viscosity of the thermoplastic material after the rubber-resin master batch is incorporated therein. As is well-known, small amounts of rubber in solution increase the viscosity of the solution while if the rubber be in dispersed or suspended form, the viscosity is not appreciably affected. As pointed out above, the viscosity of the rosin-wax solution is appreciably increased by the dissolution of the rubber-resin master batch therein and such increase in viscosity is apparent until the rubber becomes vulcanized and loses its thermoplastic and gummy characteristics.

The stiffening compound so prepared may be placed in a saturating tank and heated to 320°–350° F. to render it liquid. A porous, absorbent base web of felt, paper, cotton flannel, canvas duck or the like is saturated or impregnated with the liquid solution by pasisng it through the saturating tank, the excess saturant being removed by drawing the web through pressure rods or rolls. The web is then cooled thus depositing a solid solution within the interstices and on the surfaces of the web; when at room temperature it appears that the liquid solution has changed to its solid phase without affecting or disturbing the solution. Box toe blanks of a desired size and shape are then dried or cut from the web and, preferably, are skived to form thin or tapered edges. It will be understood the material may be sold in the form of sheets, if desired, and the shoe manufacturers may sever blanks from the sheets for use in assembling shoes.

In the above stiffening compound, it is essential that the thermoplastic materials be present in sufficient quantity to impart to the impregnated blank plasticity under the application of moderate heat; the rubber should be present in an amount sufficient to enhance the strength and toughness of the stiffener while substantially maintaining the thermoplasticity thereof. I have found that rubber in an amount not exceeding fifteen per cent of the solution by weight is satisfactory for such purposes; if greater amounts of rubber are used it is exceedingly difficult to form a satisfactory solution while the strength and toughness of the final product is not increased to an extent commensurate with the increased amount of rubber and the thermoplasticity of the final product may be affected. The solidified stiffening compound, preferably, is composed of the following ingredients in substantially the proportions stated by weight: Rosin 78 parts, candelilla wax 2 parts, cumar 8.2 parts, reclaim rubber 10.7 parts, sulfur 1 part, anti-oxidant 0.1 part.

When it is desired to assemble a shoe, the box toe blank is heated to moderate temperature (roughly, 140° F. to 185° depending upon the softening point of the thermoplastic compound) to render it soft and plastic so that it may be drawn and molded in the pulling-over and bed-lasting operations. When the molded box toe has set, it is tough, flexible, hard and strong and is able to resume its shape after a deforming pressure thereon has been removed.

This invention provides an economical and satisfactory shoe stiffener which possesses the characteristics heretofore enumerated for a commercially satisfactory box toe. The blank may be tempered without difficulty and can be lasted rapidly and quickly. When inserted in a shoe it will adhere to adjacent parts thereof to form a unitary structure but such adhesion is not accompanied by objectionable staining.

In my copending application, Serial No. 428,119 filed January 24, 1942, I have disclosed and claimed the thermoplastic compound and method of making the same herein described and I do not claim such compound or the method of making the same except as it forms the subject matter of the application for patent hereinbefore identified.

While I have disclosed and claimed a preferred embodiment of my invention it will be understood my invention is not limited thereto since it may be otherwise embodied within the scope of the following claims:

I claim:

1. As a new article of manufacture, a normally stiff, resilient shoe stiffener blank adapted to be rapidly rendered soft and plastic by the application of moderate heat which comprises a readily permeable fibrous base carrying within its interstices and on its surface a solidified thermoplastic solution comprising rubber dissolved in a thermoplastic material and then vulcanized so that the solution retains substantially the thermoplasticity of the thermoplastic material alone, the thermoplastic material being present in sufficient quantity to impart to the stiffener plasticity under the application of moderate heat, and the rubber being present in an amount by weight not exceeding 15% of the solution to enhance the strength and toughness of the stiffener while substantially maintaining the thermoplasticity thereof.

2. As a new article of manufacture, a normally stiff, resilient shoe stiffener blank adapted to be rapidly rendered soft and plastic by the application of moderate heat which comprises a readily permeable fibrous base carrying within its interstices and on its surface a thermoplastic solid solution comprising rubber dissolved in rosin and then vulcanized so that the solution retains substantially the thermoplasticity of the rosin, the rosin being present in sufficient quantity to impart to the stiffener plasticity under the application of moderate heat, and the rubber being present in an amount by weight not exceeding 15% of the solution to enhance the strength and toughness of the stiffener while substantially maintaining the thermoplasticity thereof.

3. As a new article of manufacture, a normally stiff, resilient shoe stiffener blank adapted to be rapidly rendered soft and plastic by the application of moderate heat which comprises a readily permeable fibrous base carrying within its interstices and on its surfaces a thermoplastic solid solution composed of a milled mass of rubber and cumar dissolved in rosin, the rubber being vulcanized after dissolution so that the thermoplastic properties of the solution are not affected materially by the addition of the rubber and cumar and retains substantially the thermoplasticity of the rosin, the rosin and cumar being present in sufficient quantity to impart to the stiffener plasticity under the application of moderate heat and the rubber being present in an amount by weight not exceeding 15% of the solution to enhance the strength and toughness of the stiffener while substantially maintaining the thermoplasticity thereof.

4. As a new article of manufacture, a normally stiff, resilient shoe stiffener blank adapted to be rapidly rendered soft and plastic by the application of moderate heat which comprises a readily permeable fibrous base carrying within its interstices and on its surfaces a thermoplastic solid solution composed of a milled mass of rubber, cumar and a minor amount of rosin dissolved in a solvent composed of a preponderant amount of fused rosin and candelilla wax, the rubber being vulcanized after dissolution so that the solution retains substantially the thermoplasticity of the solvent, the rosin and wax being present in sufficient quantity to impart to the stiffener plasticity under the application of moderate heat, and the rubber being present in an amount by weight not exceeding fifteen per cent of the solution but sufficient to enhance the strength and toughness of the stiffener while substantially maintaining the thermoplasticity thereof.

5. As a new article of manufacture, a normally stiff, resilient shoe stiffener blank adapted to be rapidly rendered soft and plastic by the application of moderate heat which comprises a readily permeable fibrous base carrying within its interstices and on its surfaces a solidified thermoplastic solution composed of a vulcanized mixture of rubber dissolved in a resinous thermoplastic material, the solution retaining substantially the thermoplasticity of the thermoplastic material, the thermoplastic material being present in sufficient quantity to impart to the stiffener plasticity under the application of moderate heat, and the rubber being present in an amount by weight not exceeding 15% of the solution to enhance the strength and toughness of the stiffener while substantially maintaining the thermoplasticity thereof.

6. As a new article of manufacture, a normally stiff, resilient shoe stiffener blank adapted to be rapidly rendered soft and plastic by the application of moderate heat which comprises a readily permeable fibrous base carrying within its interstices and on its surface a solidified saturant composed of the following ingredients in substantially the proportions stated by weight:

| | Parts |
|---|---|
| Rosin | 78.0 |
| Candelilla wax | 2.0 |
| Cumar | 8.2 |
| Reclaim rubber | 10.7 |
| Sulfur | 1.0 |
| Anti-oxidant | 0.1 |

JOHN W. WILEY.

CERTIFICATE OF CORRECTION.

Patent No. 2,378,673.  June 19, 1945.

JOHN W. WILEY.

It is hereby certified that error appears in the printed specification of the above numbered patent requiring correction as follows: Page 3, first column, line 3, for "pasisng" read --passing--; line 12, for "dried" read --died--; and that the said Letters Patent should be read with this correction therein that the same may conform to the record of the case in the Patent Office.

Signed and sealed this 11th day of September, A. D. 1945.

Leslie Frazer (Seal)  First Assistant Commissioner of Patents.